United States Patent [19]

Teresinski

[11] Patent Number: 5,045,760
[45] Date of Patent: Sep. 3, 1991

[54] NEON SIGN TRANSFORMER

[75] Inventor: Hieronim Teresinski, Don Mills, Canada

[73] Assignee: Williams Sign Supplies Ltd., Mississauga, Canada

[21] Appl. No.: 529,460

[22] Filed: May 29, 1990

[51] Int. Cl.⁵ .............................................. H05B 41/36
[52] U.S. Cl. ......................... 315/209 R; 315/200 R; 315/219; 315/220; 315/DIG. 7
[58] Field of Search ............... 315/209 R, 200 R, 219, 315/220, 226, 210, 212, 315, 307, DIG. 5, DIG. 7, 241 S

[56] References Cited

U.S. PATENT DOCUMENTS

| | | | |
|---|---|---|---|
| 3,585,483 | 6/1971 | Skirvin | 315/200 A |
| 3,753,040 | 8/1973 | Quenelle | 315/241 S |
| 4,488,090 | 12/1984 | Hancock | 315/220 X |
| 4,563,616 | 1/1986 | Stevens | 315/219 X |
| 4,572,990 | 2/1986 | Leale et al. | 315/220 |
| 4,745,342 | 5/1988 | Andresen et al. | 315/200 X |
| 4,748,381 | 5/1988 | Ganser et al. | 315/200 R |
| 4,891,561 | 1/1990 | Amano et al. | 315/219 X |

*Primary Examiner*—Eugene R. LaRoche
*Assistant Examiner*—Ali Neyzari

[57] ABSTRACT

A neon sign transformer for operating a neon tube from a mains frequency alternating current comprising: a filter for filtering electro-magnetic interference from said alternating current; a first rectifier for rectifying said filtered alternating current so as to produce a low level alternating current; electrical circuit driver for generating a high frequency low level alternating current; an electrical power circuitry for generating a high frequency high level alternating current then rectified to provide said high level direct current for energizing said neon tubes.

8 Claims, 4 Drawing Sheets

| N4 | N6 |
|---|---|
| N3 ||
| N2 | N5 |
| N1 ||

NEON SIGN TRANSFORMER

FIELD OF INVENTION

This invention relates to apparatus for operating gaseous discharge tubes and particularly relates to neon sign transformers for operating a neon tube from a mains frequency alternating current by generating a high frequency high level direct current.

BACKGROUND TO THE INVENTION

Gaseous discharge tubes such as fluorescent lamps or neon tubes have generally been driven by alternating currents. In the case of neon tubes the voltage applied to the neon tubes is generally supplied at a high level in the vicinity of 5,000 to 15,000 volts.

Various attempts have heretofore been made to drive said gaseous discharge tubes by a direct current.

For example U.S. Pat. No. 4,400,184 relates to apparatus for operating gaseous discharge tubes such as fluorescent lamps on a direct current from a source of alternating current.

Moreover, U.S. Pat. No. 4,745,342 teaches a signal transformer which has a pair of secondary windings which are used to drive a pair of tandem connected FET switches which, in turn, are connected across a second direct current supply which has a high direct current voltage derived from the input alternating current voltage.

Furthermore, U.S. Pat. No. 3,753,040 teaches a strobing circuit for a fluorescent lamp where a triac connects the lamp to a ballast winding, the triac being controlled by a two transistor multi-vibrator supplied with direct current voltage through a diode connected to a tap of the ballast winding. The resistor is connected in parallel with the triac to conduct a small amount of current when the triac is non-conductive and to keep the lamp ionized.

Yet another apparatus is disclosed by U.S. Pat. No. 3,120,347 which relates to apparatus and systems for dimming and operating gaseous discharge lamps such as fluorescent lamps.

Finally, U.S. Pat. No. 4,748,381 teaches a circuit arrangement for alternating current operation of gas discharge lamps.

These and other prior art devices present relatively complicated structures which are generally ineffective to produce an efficient device for energizing neon tubes with a high energy direct current generated from an alternating current source.

Furthermore, many of the prior art devices have a general limited utility as such devices operate gaseous discharge tubes within limited power capabilities and may not generally be utilized for a wide range of tube characteristics.

It is an object of this invention to produce an improved apparatus for operating gaseous discharge tubes.

It is a further object of this invention to produce a neon sign transformer for operating neon tubes at a high voltage direct current obtained by rectifying high frequency high voltage alternating current. Such neon tube transformer is capable of generating an output between 0 and 15 Kv depending on the neon tubes which are connected thereto.

The broadest aspect of this invention relates to apparatus for operating a gaseous discharge tube from an alternating current comprising: a filter for filtering electro-magnetic interference from said alternating current; a rectifier for rectifying said filtered alternating current so as to produce a low level direct current; electrical circuit driver for generating a high frequency low level drive current; an electrical power circuitry for generating a high frequency high level current for energizing said gaseous discharge tubes.

It is another aspect of this invention provides a neon sign transformer for operating a neon tube from a mains frequency alternating current comprising: a filter for filtering electromagnetic interference from said alternating current; a first rectifier for rectifying said filtered mains frequency alternating current to a low level direct current; electrical circuit driver for generating a high frequency low level alternating current including, a first transistor for generating said high frequency low level current, a drive transformer; electrical power circuitry for generating a high frequency high level alternating current for energizing said neon tube including, a second transistor for generating said high frequency power, a high voltage transformer for generating said high level voltage, and a second rectifier for generating a high frequency high voltage direct current for energizing said gaseous discharge tubes.

It is yet another aspect of this invention to provide a neon sign transformer for operating a neon tube from a 60 Hz 120 v alternating current source comprising: a filter for filtering electro-magnetic interference from said 60 Hz 120 alternating current source; an in rush current protection for protecting said transformer from said in rush current; a first rectifier for rectifying said 60 Hz 120 v alternating current to approximately 150 v direct current; electrical circuit driver powered by said 150 v direct current for generating approximately 20 KHz alternating current signal including, a first transistor for generating said 20 KHz signal, a drive transformer; and electrical power circuitry for generating approximately a 20 KHz alternating current signal and then transformed to a 0 and 15 Kv direct current in response to the characteristics of a neon tube connected thereto including, a second transistor driven by said drive transformer for generating said 20 KHz frequency, high voltage transformer for generating an output between 0 and 15 Kv, and a second rectifier for generating a direct current at a 0 to 15 Kv for energizing said neon tubes.

DESCRIPTION OF THE DRAWINGS

These and other objects and features shall now be described in relation to the following drawings.

DETAILED DESCRIPTION OF THE INVENTION

Like parts have been given like numbers throughout the figures.

Figure 1:
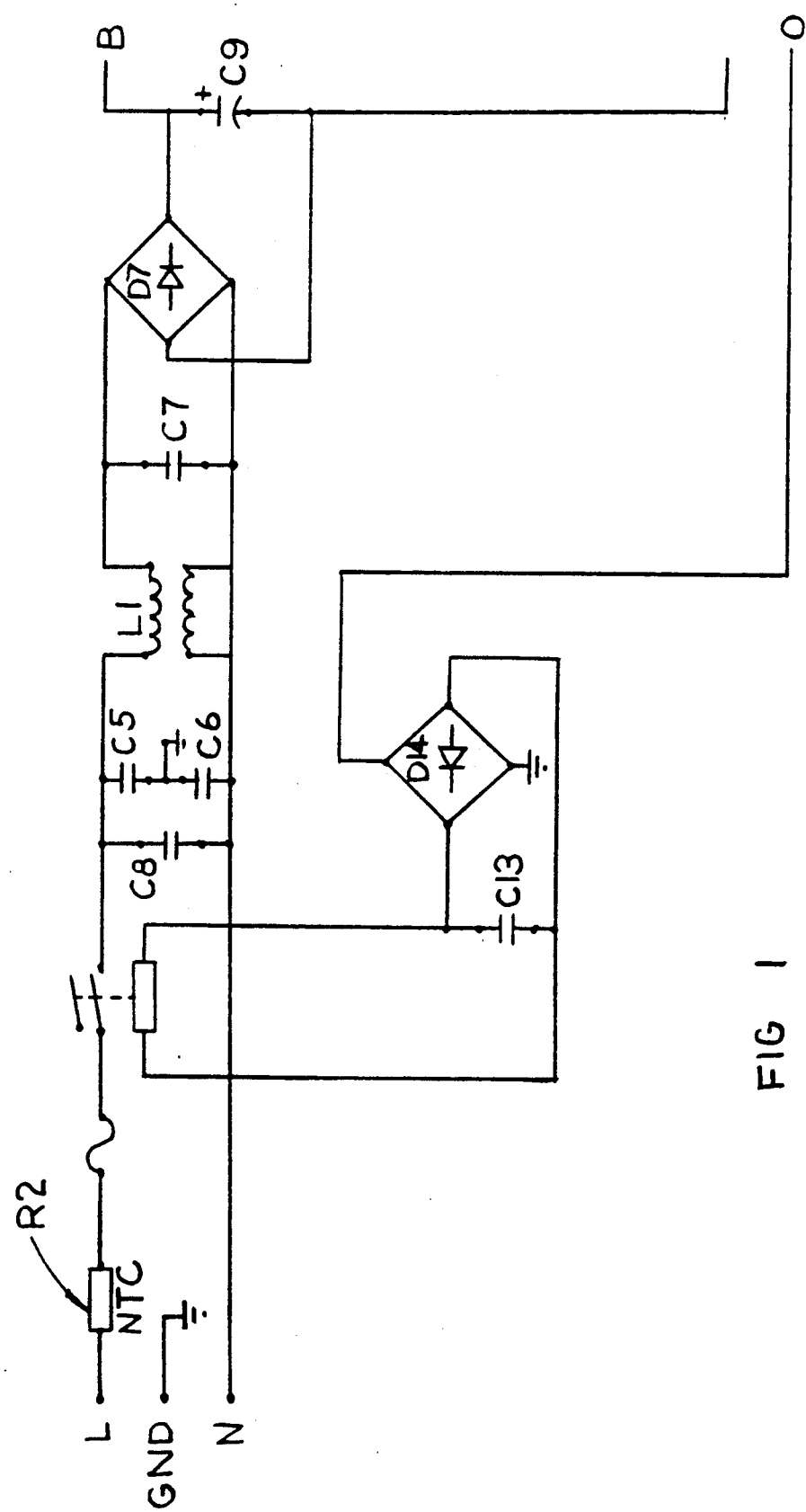
FIG. 1 is a schematic drawing of the supply section showing the filter and first rectifier of the neon sign transformer.

FIG. 1 generally illustrates the supply section of the neon side transformer and includes a plug having a Ground GND, Neutral N and Load L wires. The supply for the plug will generally consist of a 60 Hz 120 v alternating current or mains current. The supply section also includes fuse F1 which will protect the circuitry from an overload situation.

The filter for filtering electro-magnetic interference or noise generally comprises Capacitors $C_8$, Inductants $L_1$ and Capacitors $C_5$ and $C_6$ and $C_7$.

Furthermore, a Resistor $R_2$ is utilized as an in rush current protector.

A Rectifier $D_7$ and Capacitor $C_9$ is utilized to rectify the 60 Hz 120 v alternating current to produce a low level direct current voltage such as 150 v between points B and O.

Figure 2:
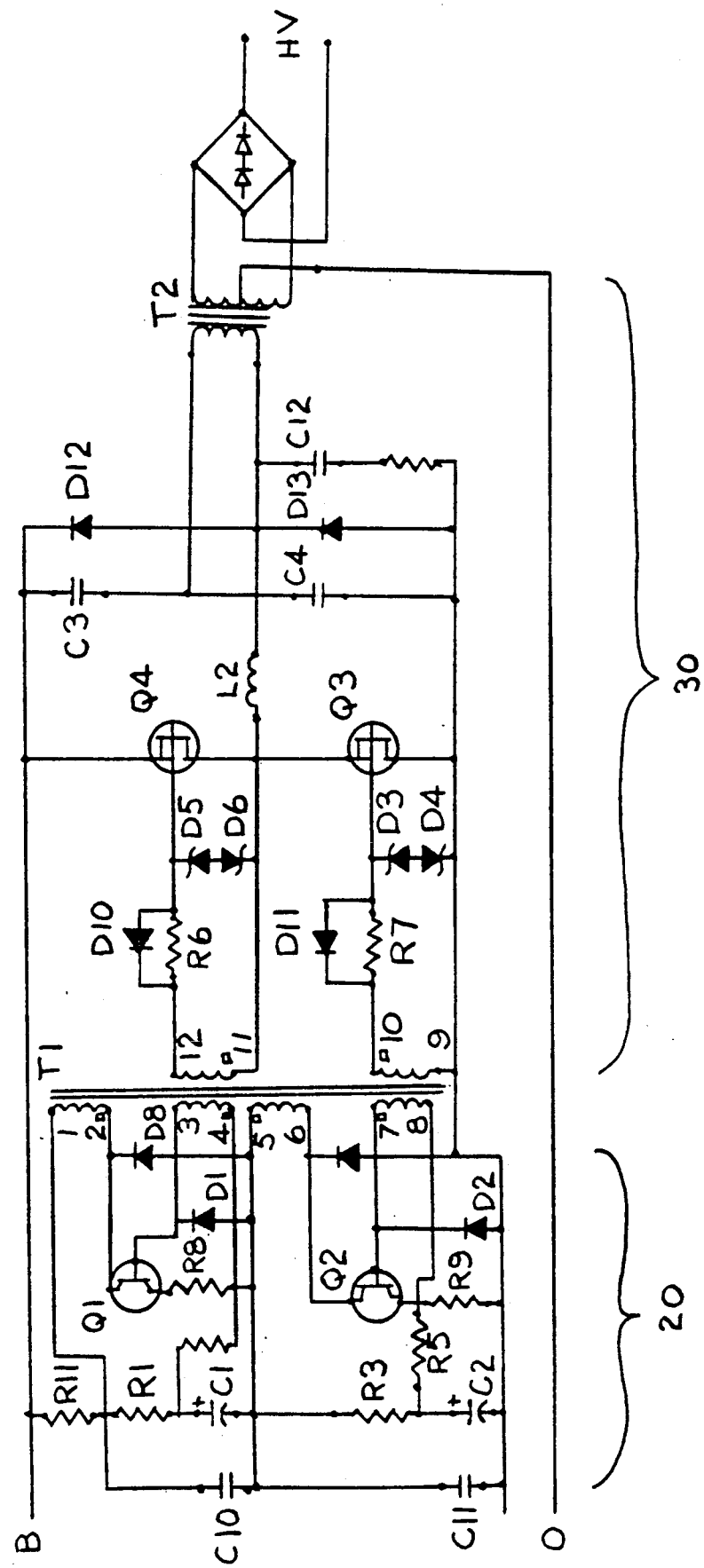
FIG. 2 is a schematic drawing the driver stage and power stage of the neon sign transformer.

FIG. 2 generally describes the driver stage 20 and power stage 30.

The driver stage is generally utilized to generate a 20 KHz frequency from the direct current at points B and O. The transistors $Q_1$ and $Q_2$ generate the frequency and the drive transformer $T_1$ drives the output transistors $Q_4$ and $Q_3$ located in the power stage section.

Figures 3, 4:
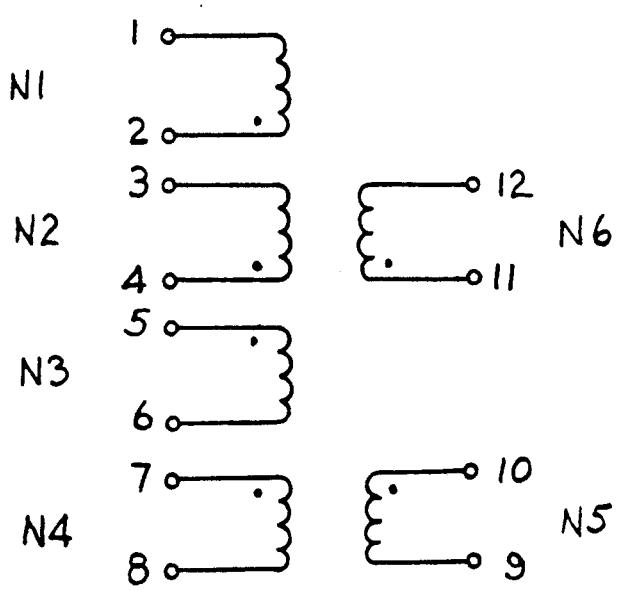
FIG. 3 is a schematic diagram of the drive transformer.
FIG. 4 is a placement cross-section of the drive transformers.

FIG. 3 generally illustrates the drive transformer specifications and in particular the following elements N comprise the following turns having a AWG # at the following start and finish points, namely:

| Element | Start | Finish | Turns | AWG # |
|---|---|---|---|---|
| N 1 | 2 | 3 | 120 | 36 |
| N 3 | 5 | 6 | 120 | 36 |
| N 2 | 4 | 3 | 4 | 36 |
| N 4 | 7 | 8 | 4 | 36 |
| N 5 | 10 | 9 | 16 | 29 |
| N 6 | 11 | 12 | 16 | 29 |

More particularly FIG. 4 illustrates the physical separation of the various elements of the drive transformer. In particular a physical separation occurs between N 4 and N 6 as well as N 2 and N 5. Furthermore each of the layers are insulated by a 1 mm insulation of mylar or polyester.

Moreover the core of the drive transformer comprises a E F 20, G A P of 0. In particular it has been found that favourable results can be shown by using a Siemens (trade mark) having a specification of B66311-G000-X127.

Good results have been achieved by using a Siemens (trade mark) bobbin having specification B66206-A1012-T001.

Furthermore a Siemens (trade mark) yoke having a specification of B66206-A2001-X00 has been used with favourable results.

Moreover it should be mentioned that the yoke is optional although the core may not be loose.

The power stage 30 illustrated in FIG. 2 comprises drive transistors $Q_3$ and $Q_4$ which are driven by drive transformer $T_1$ so as to generate a high frequency power.

Furthermore a high voltage transformer $T_2$ is utilized so as to produce a high voltage output.

In particular good results have been achieved by using a high voltage transformer having the following specifications:
- core-ferroxcub 1F19 3C8
- gap-0.125 mm spacer each leg
- windings - primary 28 turns A W G Symbolic form of number 18
- secondary 3,700 turns AWG # 37, centre taped, connected to the pin Each layer of secondary winding is separated by a layer of mylar which may be 2 mm minimum and each of the turns are to be protected so as not to drop into the underlying layers.

Moreover the windings are to be vacuum-potted. The winding capacitance is kept as low as possible and the spacing below the high voltage terminals and the terminals themselves are to meet regulations for 15 Kv working voltage device with a 7.5 Kv terminal to ground.

Moreover an output rectifier is utilized having an operating frequency of 18 KHz with an output voltage of 16.5 Kv maximum working specified at least 20 Kv, with a reverse recovery of 250 ns or better.

Favourable results have been utilized by using diodes VG-10XVARO, two in series for each branch of a full bridge output rectifier. An alternate diode which may be utilized that has been found to work favourably is DL 1000, edi.

Figure 5:
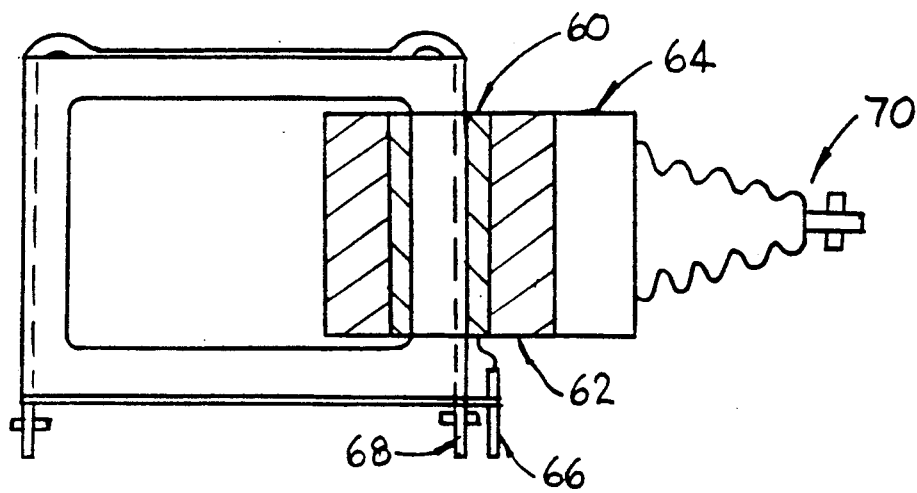
FIG. 5 is a side elevational cross-sectional view of the high voltage transformer.

In order to reduce leakage inductance (which is to be in a range of approximately 5%) both primary and secondary windings are preferably located on the same column as shown in FIG. 5.

Each layer of secondary winding is to be separated by a layer of mylar and each of the turns are to be protected so as not to drop into the underlying layers The second rectifiers or high voltage rectifiers may be located in the high voltage transformer as best seen in FIG. 5.

The driver stage 20 is independent of the power stage 30 and therefore the driver stage 20 is independent of the load, and one has devised, therefore, a circuit that withstands the open and short circuit at output.

A coil $L_2$ is located in the power stage and limits the current in short circuit. Furthermore diodes $D_{12}$ and $D_{13}$ minimize damage from a no load situation as they are utilized to dissipate energy.

The output rectifier is capable of generating 0 to 15 Kv depending on the load or neon tubes attached to the terminals of the high voltage output transformer $T_2$.

Accordingly the device takes little power when a small load is applied thereto. This is achieved by the semi-resonate mode of operation of the device by picking the frequency and tuning the circuitry for the high voltage transformer and coil.

Accordingly the device is very versatile as the device may be used to drive or energize one or ten neon tubes attached thereto or any number of tubes in between. In other words, the neon sign transformer can be used for a wide range of tube lengths.

Furthermore the size and weight of the transformer is dramatically reduced, the electronic transformer uses the principles of high reactants to limited short circuit current.

Moreover the electronic transformer can survive extended periods of short circuit operation without damage.

Figure 6:
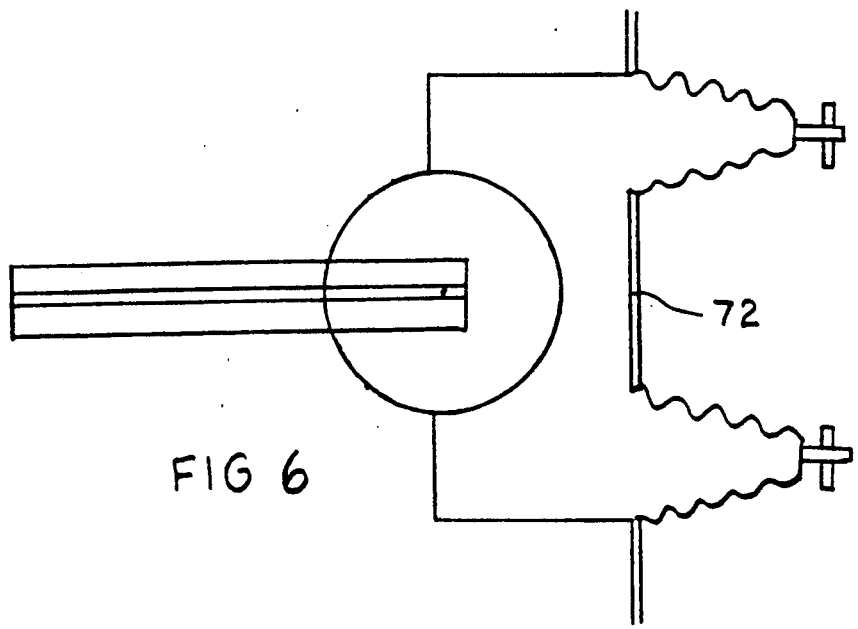
FIG. 6 is a top plan view of the high voltage transformer.
Figure 7:
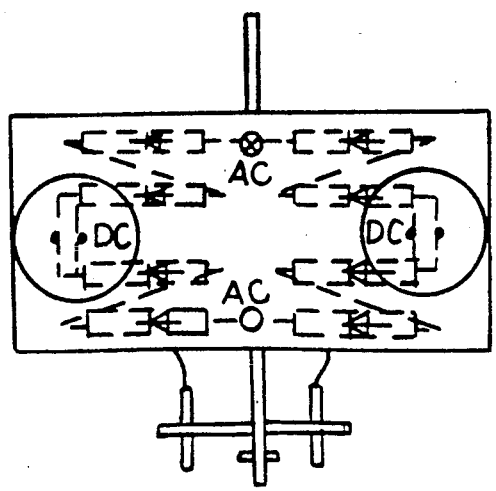
FIG. 7 is a representative drawing of suggested diodes placement.

FIG. 5 illustrates the primary winding 60, secondary winding 62, location of rectifiers 64, ground pin 66, primary connectors 68 and the high voltage terminal 70 which in the approved amendment consists of a 7.5 kilovolt working voltage. Moreover, FIG. 6 shows the aluminium box 72 as well as the high voltage terminal 70 protruding through the holes in the box 72.

Although the preferred embodiments as well as the operation and use have been specifically designed in relation to the drawings, it should be understood that variations in the preferred embodiments could easily be achieved by a person skilled in the art without departing from the spirit of the invention. Accordingly, the invention should not be understood to be limited to the exact form revealed in the drawings.

The embodiments of the invention in which an exclusive property or privilege is claimed are defined as follows:

1. A neon sign transformer for operating a neon tube from a mains frequency alternating current comprising:
   (a) filter means for filtering electro-magnetic interference from said alternating current;
   (b) first rectifying means for rectifying said filtered mains frequency alternating current to a low level direct current;
   (c) electrical circuit driver means for generating a high frequency low level alternating driving current, including:
      (i) first transistor means for generating said high frequency low level current;
      (ii) drive transformer means.
   (d) electrical power circuitry means for generating a high frequency high level alternating current for energizing said neon tube including:
      (i) second transistor means for generating said high frequency power;
      (ii) high voltage transformer means for generating said high level voltage;
      (iii) second rectifying means for generating a high voltage direct current for energizing said neon tubes.

2. A neon sign and transformer as claimed in claim 1 further including in rush current protector means.

3. A neon sign transformer as claimed in claim 2 wherein said in rush current protector means comprises an NTC termister.

4. A neon sign transformer as claimed in claim 3 wherein said electrical circuit driver means is independent of said electrical power circuitry means.

5. A neon sign transformer as claimed in claim 4 wherein said electrical power circuitry means includes inductance means for limiting current in said electrical power circuitry means when subjected to a short circuit.

6. A neon sign transformer as claimed in claim 5 wherein said electrical power circuitry means includes diode means for protecting said neon sign transformer from a no load condition.

7. In a neon sign transformer for operating a neon tube from a 60 Hz 120 v alternating current source comprising:
   (a) filter means for filtering electro-magnetic interference from said 60 Hz 120 v alternating current source;
   (b) in rush current protector means for protecting said transformer from in rush currents;
   (c) first rectifying means for rectifying said 60 Hz 120 v alternating current to approximately 150 v direct current;
   (d) electrical circuit driver means powered by said 150 v direct current for generating approximately a 20 KHz alternating current signal including:
      (i) first transistor means for generating said 20 KHz signal;
      (ii) drive transformer means.
   (e) electrical power circuitry means for generating approximately 20 KHz alternating current signal and then transformed to a 0 and 15 Kv direct current in response to the characteristics of a neon tube connected thereto including:
      (i) second transistor means driven by said drive transformer means for generating said 20 KHz alternating current;
      (ii) high voltage transformer means for generating an output between 0 and 15 Kv;
      (iii) second rectifying means for generating direct current at a 0 to 15 Kv for energizing said neon tubes.

8. A neon sign transformer for operating a neon tube from a mains frequency alternating current comprising:
   (a) first rectifying means for rectifying said mains frequency alternating current to a low direct current;
   (b) electrical circuit driver means for generating a high frequency low level alternating driving current, including:
      (i) first transistor means for generating said high frequency low level current;
      (ii) drive transformer means.
   (c) electrical power circuitry means for generating a high frequency high level alternating current for energizing said neon tube including:
      (i) second transistor means for generating said high frequency power;
      (ii) high voltage transformer means for generating said high level voltage;
      (iii) second rectifying means for generating a high voltage direct current for energizing said neon tubes.

* * * * *